June 8, 1954
H. W. HAPMAN
2,680,511
SANITARY FLIGHT CONVEYER
Filed Nov. 15, 1950
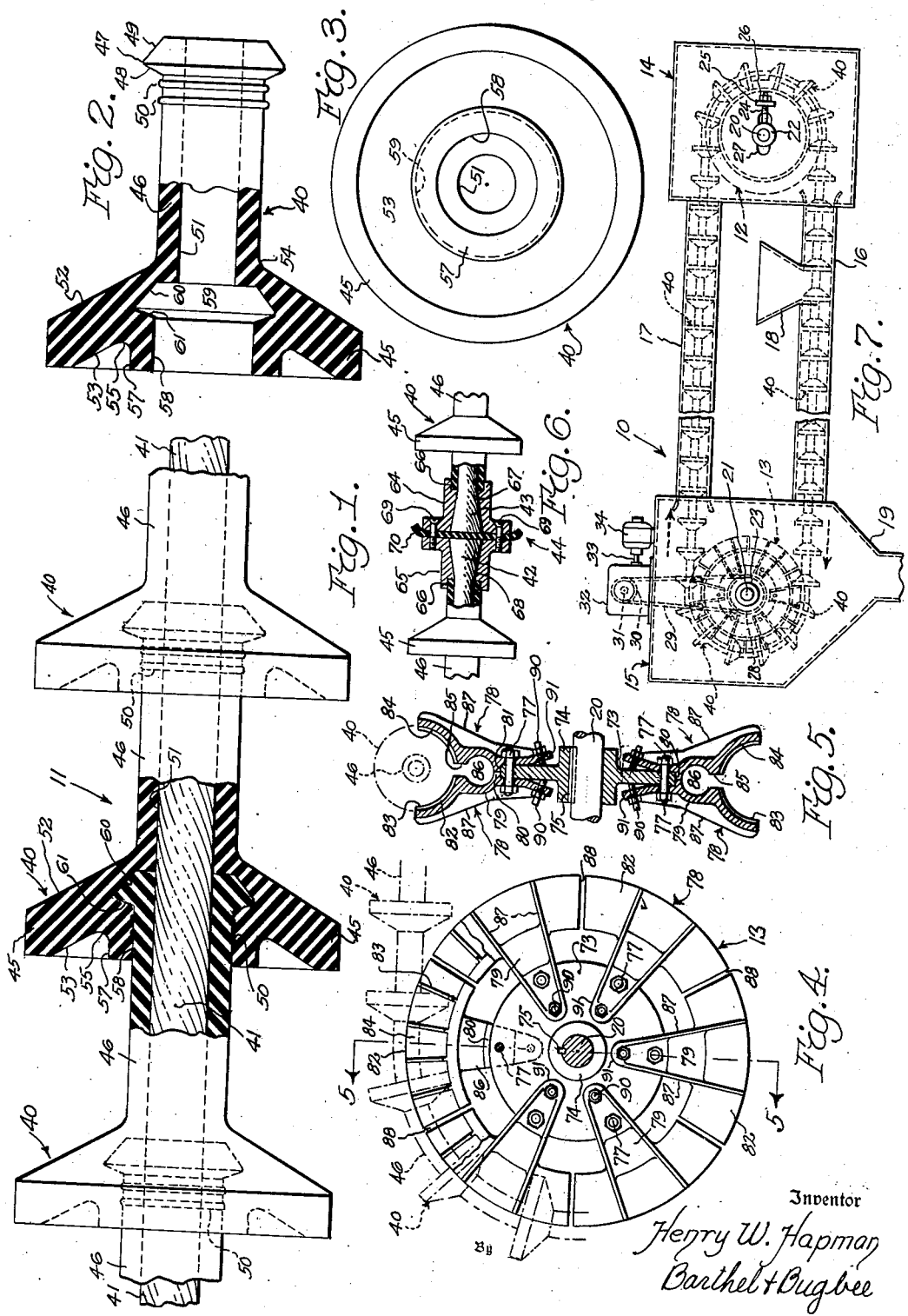
Inventor
Henry W. Hapman
Barthel + Bugbee
Attorneys Patented June 8, 1954

2,680,511

UNITED STATES PATENT OFFICE 2,680,511

SANITARY FLIGHT CONVEYER

Henry W. Hapman, Kalamazoo, Mich., assignor of forty per cent to Hannah Jane Hapman, Kalamazoo, Mich.

Application November 15, 1950, Serial No. 195,847

5 Claims. (Cl. 198—176)

This invention relates to flight conveyor installation and, in particular, to sanitary flight conveyors.

One object of this invention is to provide a sanitary flight conveyor installation which is substantially free from cavities or recesses in which particles of conveyed material might lodge and which is easily cleaned to prevent contamination of materials subsequently conveyed.

Another object is to provide a sanitary flight conveyor installation of the cable-mounted type having interlocking flights and separators so constructed as to present no cracks or fissures in which conveyed material might lodge, the interlocking arrangement being such that the conveyor can turn corners or pass around guide wheels or driving wheels without disturbing the seal or opening up recesses which otherwise remain closed in straight-away runs of the conveyor.

Another object is to provide a sanitary flight conveyor installation having a sanitary drive wheel or guide wheel, the periphery of which has openings through which the conveyed material may drop without adhering or packing, and through which the wheel can be cleaned by means of a blast of fluid, such as air, steam, water or the like.

Another object is to provide a sanitary flight conveyor installation of the cable-mounted type having resilient flights and separators which are so interconnected that the pressure of the conveyed material on the flights during the conveying operations causes the flights and their separators to tightly grip the cable on which they are mounted, thereby preventing slipping of the flights along the cable.

Another object is to provide a sanitary flight conveyor installation of the foregoing character wherein the flights and their separators are assembled on the cable in a longitudinally compressed condition which further prevents slippage of the flights along the cable.

In the drawings:

Figure 1 is a side elevation, partly in central vertical section, of a portion of a flight conveyor according to one form of the invention;

Figure 2 is a side elevation, partly in central vertical section, of a conveyor flight and separator employed in the flight conveyor shown in Figure 1;

Figure 3 is a left-hand end elevation of the flight conveyor and separator shown in Figure 2;

Figure 4 is a side elevation, with the upper portion broken away and partly in vertical section, of a sanitary drive wheel or guide wheel used in guiding or driving flight conveyor of Figure 1;

Figure 5 is a central vertical cross-section through the wheel shown in Figure 4, taken along the line 5—5 in Figure 4;

Figure 6 is a side elevation, in reduced scale and partly in central vertical section, of a coupling device used with the flight conveyor of Figure 1; and Figure 7 is a side elevation of a flight conveyor installation employing the flight conveyor and guide or drive wheel of Figures 1 to 6 inclusive.

Flight conveyors for conveying food stuffs, chemicals and other perishable or contaminatable materials, have hitherto been unsatisfactory because of the existence of recesses or crevices in which the conveyed material could lodge and, in case of food stuffs, spoil and serve as breeding places for bacteria. Moreover, such recesses or crevices have been difficult to clean satisfactorily, with the result that an apparently clean conveyor has been actually only superficially clean and the particles of conveyed material hidden in the crevices contaminate subsequent batches of conveyed material. Furthermore, it has also been difficult to drive and guide such conveyors because of similar conditions occurring in the guide wheels or drive wheels, preventing thorough cleaning.

The present invention provides a sanitary flight conveyor installation made up of integral disc flights and separators which are interlocked in such a manner on a flexible propelling member such as a cable that no recesses or crevices occur either on a straight-away run or in turning corners or passing around a guide wheel or drive wheel. The conveyor flights are assembled in longitudinally compressed condition on the cable so that the pressure of the conveyed materials squeezes the flights and their separators tightly against the cable and prevents longitudinal slippage. The guide wheels or drive wheels for the flight conveyor are also of a sanitary construction having open peripheries with openings through which the conveyed material can drop without adhering or packing, and through which a blast of a cleaning fluid, such as air, water, or steam can be passed.

Referring to the drawings in detail, Figure 7 shows diagrammatically a sanitary flight conveyor installation, generally designated 10, of the present invention which employs a sanitary flight conveyor, generally designated 11, also according to the present invention as guided and driven by a sanitary guide wheel 12 and driving wheel 13 rotatably mounted in spaced casings 14 and 15 placed at locations which are remote from one another. The casings 14 and 15 are interconnected by forward and return conduits 16 and 17 respectively, the forward conduit 16 having a filling hopper 18 and the casing 15 having a discharge spout 19. The guide and drive wheels 12 and 13 are mounted on shafts 20 and 21 which are journaled as at 22 and 23 respectively in the casings 14 and 15. The journal device 22 is movably mounted in the casing 14 by means of screw rods 24 passing through lugs 25 projecting outward from the casing 14 and having adjusting nuts 26 threaded thereon. Slots 27 are provided in the casing 14 to permit the shaft 20 to be moved to and fro in order to take up slack in the flight conveyor 11.

Mounted on and drivingly connected to the shaft 21 is a sprocket 28 (Figure 7) which is driven by means of a sprocket chain 29 from a sprocket 30 mounted on the output shaft 31 of a reduction gear box or gearset 32, the input shaft 33 of which is drivingly connected to an electric motor 34 mounted on top of the casing 15. The casings 14 and 15 are vertically arranged so as to receive the vertically-disposed wheels 12 and 13 mounted on horizontal shafts 20 and 21.

The flight conveyor 11 is made up of combined flight and separator units, generally designated 40 (Figure 2) of elastic deformable material such as natural or synthetic rubber or similar materials. The flight units 40 are mounted upon a flexible propelling member 41, such as a stranded steel cable, the free ends 42 and 43 of which are coupled to one another by a coupling device, generally designated 44 (Figure 6). Each flight unit 40 includes a disc-like flight portion 45 and a tubular separator portion 46 projecting from one side thereof. The separator portion 46 terminates in an enlarged annular head 47 having oppositely tapered convex surfaces 48 and 49 on opposite sides thereof. Immediately adjacent the head 47, the separator portion 46 is provided with one or more sealing ridges 50, and also with an internal bore 51 for receiving the cable 41.

The flight portion 45 also has approximately conical tapered surfaces 52 and 53, the surface 52 being convex and the surface 53 concave. The surfaces 52 and 53 are thus tapered in the same direction, the surface 52 being rounded as at 54 where it meets the separator portion 46 and the surface 53 being rounded as at 55 where it meets the hub portion 57 of the flight portion 45. The hub portion 57 is provided with a bore 58 which has an internal diameter slightly smaller than the outside diameter of the separator portion 46, so that these portions of adjacent units 40 will fit snugly together when assembled, as shown in Figure 1. Between the bores 58 and 51, in the hub portion 57 and separator portion 46, an annular cavity or socket 59 is provided corresponding in configuration to the configuration of the head 47 and consequently having correspondingly tapered walls 60 and 61 respectively.

The coupling device 44 (Figure 6) by which the free ends of the cable 41 are coupled to one another, consists of coupling halves 64 and 65 of similar construction having annular sockets 66 for receiving the ends of the separator portions 46 from which the heads 47 have been severed. The coupling halves 64 and 65 are provided with conical internal bores 67 and 68 for receiving the enlarged approximately conical ends 42 and 43 of the cable 41, these ends being enlarged by expanding them and filling them with solder. The coupling halves 64 and 65 are bored and threaded respectively to receive coupling bolts or screws 69 and between the coupling halves 64 and 65 is clamped a disc 70 of elastic deformable material, such as natural or synthetic rubber. The periphery of the resilient disc 70 may either be flush with the peripheries of the coupling halves 64, 65 or it may project beyond them as shown in Figure 6, to provide a wiping action.

The guide wheel 12 and driving wheel 13 are of similar construction, hence a single description, with similar reference numerals, will suffice for both. The wheel 12 or 13 consists of a central disc 73 (Figures 4 and 5) having a hub 74 which is keyed as at 75 to the shaft 20 or 21 as the case may be. The disc 73 is bored at spaced intervals around its periphery to receive bolts 77 by which periphery sectors generally designated 78 are secured to the disc 73. Each of the sectors 78 consists of a pair of spoke-like transversely spaced legs 79 disposed on opposite sides of the disc 73 (Figure 5) and provided with arcuate flanges 80 (Figure 4) adapted to snugly grip the periphery 81 of the disc 73 and prevent the legs 79 from rocking. At their outer ends, the legs 79 carry peripheral portions 82 of arcuate cross-section and having arcuate ribs 83 located in radial planes on concave toroidal surfaces 83 curved to fit the flight portions 45 of the flight conveyor 11 and separated transversely from one another by arcuate gaps 85 (Figure 5). The latter open into open-ended bores 86 forming passageways through which the conveyed material may fall and also through which a blast of cleaning fluid may be passed—for example, compressed air, steam or water. As shown in the upper part of Figure 4, the pairs of oppositely-facing legs 79 are also spaced apart from one another in a circumferential direction, so that the open ends of the bores 86 are likewise spaced apart from one another in a circumferential direction by circumferential gaps enabling the escape of the conveyed material falling through the bores 86. Each leg 79 of the peripheral sectors 78 is strengthened by a pair of approximately radial webs 87. The sectors 78 are preferably separated from one another by minute gaps 88 (Figure 4) to facilitate assembly. The arcuate flanges 80, by engaging the periphery 81 of the disc 73, prevent circumferential rocking of the sectors 78, but the latter may be rocked transversely toward or away from their opposite sectors 78 by means of adjusting screws 90 threaded through the outwardly inclined inner ends 91 of the legs 79 (Figure 5) and engaging the opposite sides of the disc 73. This provides a take-up to compensate for wear of the flight portions by controlling the separation of the opposite surfaces 84.

In the assembly of the sanitary flight conveyor installation 10 of this invention, the flight conveyor 11 is first put together. A suitable length of cable 41 is selected, the length being such that it is shorter than the length of the combined flight and separator unit by about ¼ inch for each unit. The units 40 are threaded upon the cable 41 like beads on a string and lubricated with mineral oil while the head 47 of each unit 40 is forced through the bore 58 into the socket 59 of the next succeeding unit 40, the sealing ribs 50 and the adjacent end of the separator 46 snugly engaging the bore 58 because of the fact that the bore 58 is of slightly smaller diameter than the separator 46.

In order for the head 47 to enter its socket 59, it necessarily deforms the hub 57 by pushing it outward, the hub 57 by reason of its resilience, snapping back into place behind the head 47 after the head 47 has passed into the socket or cavity 59. The parts now occupy the positions shown in the central portion of Figure 1, and are snugly interlocked.

The free ends 42 and 43 of the cable 41 are now expanded (Figure 6) into the tapered or conical bores 67, 68 of the coupling halves 64 and 65 after the latter have been inserted thereon, the spaces between the strands being filled with solder to make the end enlargement 42, 43 permanent. While this is being done, the assembly of interlocked units 40 is compressed longitudinally so that when the assembly is released, the units 40 remain in a compressed condition. The coupling halves 64, 65 of the coupling device 40 are then bolted together with the gasket or resilient disc 70 in between them (Figure 6) after the flight conveyor 11 has been passed through the conveyor conduits 16 and 17 and around the guide wheel 12 and driving wheel 13. In the final assembly, the parts occupy positions shown in Figure 7.

In the operation of the invention, the electric motor 34 is started in operation, driving the shaft 21 through the reduction gear box 30 and sprocket chain 29, rotating the driving wheel 13 and consequently causing the flight conveyor 11 to traverse the conduits 16 and 17 and the casings 14 and 15. The screw rods 24 are adjusted, if necessary, by tightening or loosening the nuts 26 until the flight conveyor has the desired tautness or slackness.

The material to be conveyed is placed in the hopper 18 and is carried by the flight portions 45 of the units 40 in the direction of the arrows (Figure 7) until the casing 15 is reached, whereupon the conveyed material falls under the force of gravity downward through the discharge spout 19 and into any suitable receptacle or processing machine. Due to the open construction of the wheels 12 and 13, material may drop through them into their respective casing. The now empty flight conveyor 11 passes around the drive wheel 13, the grip of the flights 45 with the wheel 13 being enhanced by their engagement with the arcuate rib 83. The flight conveyor then passes through the return conduit 17, into the casing 14, and around the guide wheel 12 and back through the forward conduit 16 to the hopper 18, whereupon the cycle of operation is repeated.

As the flight units 40 engage the conveyed material, the latter tends to resist them. As the flight units 40 are already in a precompressed condition, the force of engagement of the flights 45 with the conveyed material causes the separators 46 to more tightly grip the cable 41, thus preventing slippage along the cable. In this manner, the conveying load is transferred to the cable 41.

When the conveyor installation 10 has ceased operation, the guide wheel and drive wheel 12 and 13 and the flight conveyor 11 supported by them are cleaned by means of blasts of compressed air, steam or water under pressure, thereby removing all particles of the material. Since the hub portion 57 of one unit 40 snugly engages the separator portion 46 of the next succeeding unit 40, none of the conveyed material can enter the conveyor at these locations, and no bacteria can find a lodging place. The conveyor installation 10 and the flight conveyor 11 used by it are especially adaptable to food and chemical industries as well as for conveying paint colors or other materials, such as would contaminate one another irreparably in the ordinary type of conveyor.

What I claim is:

1. A flight conveyor comprising a flexible propelling member, and a multiplicity of combined flight and separator units of resilient material mounted on said member, each unit having a bored disc flight and a tubular separator projecting axially therefrom, each flight bore having a socket therein and each separator having an enlargement which is radially offset from the rest of said separator, said enlargement having a configuration corresponding to said socket, the enlargement of each unit fitting snugly into the socket of the next adjacent unit.

2. A flight conveyor comprising a flexible propelling member, and a multiplicity of combined flight and separator units of resilient material mounted on said member, each unit having a bored disc flight and a tubular separator projecting axially therefrom, said flight having a bore therethrough for receiving said flexible propelling member, said flight also having a counterbore therein coaxial with said bore but of larger diameter than said bore, the diameter of said counterbore in said disc flight being slightly smaller than the outer diameter of the end portion of said separator and said end portion of said separator being snugly seated in said counterbore in a radially compressed condition.

3. A flight conveyor comprising a flexible propelling member, and a multiplicity of combined flight and separator units of resilient material mounted on said member, each unit having a bored disc flight and a tubular separator projecting axially therefrom, each flight bore having a socket therein and each separator having an enlargement of configuration corresponding to said socket, the enlargement of each unit fitting snugly into the socket of the next adjacent unit, each separator having an annular sealing projection thereon.

4. A combined flight and separator unit for flight conveyors, comprising a body of resilient material having a bored disc flight portion and an integral tubular separator portion projecting from one side thereof, the flight bore having a socket therein, and the separator portion having an enlargement thereon which is radially offset from the rest of said separator, said enlargement having a configuration corresponding to said socket.

5. A combined flight and separator unit for flight conveyors, comprising a body of resilient material having a bored disc flight portion and an integral tubular separator portion projecting from one side thereof, the flight bore having a socket therein, and the separator portion having an enlargement thereon of configuration corresponding to said socket, said separator portion having an annular sealing projection thereon.

References Cited in the file of this patent

UNITED STATES PATENTS

| Number | Name | Date |
|---|---|---|
| 247,622 | Doty | Sept. 27, 1881 |
| 646,634 | Brosi | Apr. 3, 1900 |
| 872,423 | Hodell | Dec. 3, 1907 |
| 1,769,336 | Detaint et al. | July 1, 1930 |
| 2,326,535 | Hapman | Aug. 10, 1943 |
| 2,476,040 | Hapman | July 12, 1949 |
| 2,595,941 | Hapman | May 6, 1952 |